(12) United States Patent  
Bömer et al.

(10) Patent No.: US 6,496,181 B1  
(45) Date of Patent: *Dec. 17, 2002

(54) SCROLL SELECT-ACTIVATE BUTTON FOR WIRELESS TERMINALS

(75) Inventors: Leopold Bömer, McKinney; Ben Steele, Quinlan, both of TX (US); Dave McDowell, LaJolla, CA (US)

(73) Assignee: Siemens Information and Communication Mobile LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/943,328

(22) Filed: Oct. 3, 1997

(51) Int. Cl.$^7$ ................................................. G09G 5/08
(52) U.S. Cl. ....................................... 345/167; 345/157
(58) Field of Search ................................. 345/156, 157, 345/161, 164, 167, 168, 169, 184; 455/566, 550, 556, 557

(56) References Cited

U.S. PATENT DOCUMENTS

| | | | |
|---|---|---|---|
| 4,550,221 A | 10/1985 | Mabusth | 178/18 |
| 4,585,908 A | 4/1986 | Smith | 179/81 C |
| 4,886,941 A | 12/1989 | Davis et al. | 178/18 |
| 4,913,387 A | 4/1990 | Tice | 248/918 |
| 5,122,654 A | 6/1992 | Koh et al. | 250/221 |
| 5,178,477 A | 1/1993 | Gambaro | 400/489 |
| 5,231,380 A | 7/1993 | Logan | 340/706 |
| 5,332,322 A | 7/1994 | Gambaro | 400/489 |
| RE34,931 E | 5/1995 | Duchon | 250/221 |
| 5,414,445 A | 5/1995 | Kaneko et al. | 345/163 |
| 5,424,756 A | 6/1995 | Ho et al. | 345/158 |
| 5,425,077 A | 6/1995 | Tsoi | 379/58 |
| 5,436,954 A | 7/1995 | Nishiayama et al. | 379/58 |
| D363,710 S | 10/1995 | Mateus et al. | D14/114 |
| 5,457,480 A * | 10/1995 | White | 345/163 |
| 5,463,388 A | 10/1995 | Boie et al. | 341/33 |
| 5,528,523 A | 6/1996 | Yoshida | 364/709.11 |
| D372,231 S | 7/1996 | Huang | D14/114 |
| 5,543,821 A | 8/1996 | Marchis et al. | 345/167 |
| 5,563,631 A * | 10/1996 | Masunaga | 345/169 |
| 5,572,237 A | 11/1996 | Crooks et al. | 345/156 |
| 5,583,541 A | 12/1996 | Solhjell | 345/163 |
| 5,583,560 A | 12/1996 | Florin et al. | 348/7 |
| 5,589,893 A | 12/1996 | Gaughan et al. | 348/734 |
| 5,724,106 A * | 3/1998 | Autry et al. | 348/734 |
| 5,784,052 A * | 7/1998 | Keyson | 345/167 |
| 5,956,625 A * | 9/1999 | Hansen et al. | 455/90 |
| 6,152,918 A * | 11/2000 | Padilla et al. | 606/15 |
| 6,201,534 B1 * | 3/2001 | Steele et al. | 345/157 |
| 6,208,879 B1 * | 3/2001 | Iwata et al. | 455/566 |

* cited by examiner

*Primary Examiner*—Bipin Shalwala
*Assistant Examiner*—Mansour M. Said

(57) ABSTRACT

A side-mounted cursor pointing device (108) for a wireless terminal (100) including a sliding cover (110). The sliding cover (110) slides over the cursor pointing device (108) in an off position. When the cover (110) is slid off the cursor pointing device (108), a biasing member (212) upon which the cursor pointing device (108) rests allows the cursor pointing device (108) to pop into position and allows the user to press down on the cursor pointing device (108) in order to make a selection. The sliding cover may be an on-off switch for the wireless terminal.

24 Claims, 10 Drawing Sheets

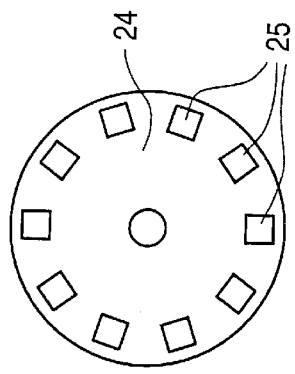
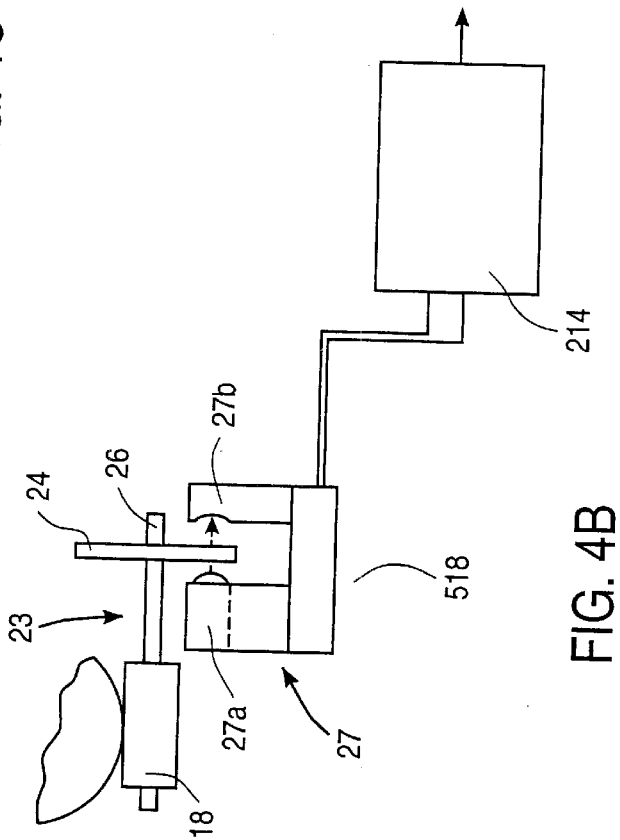
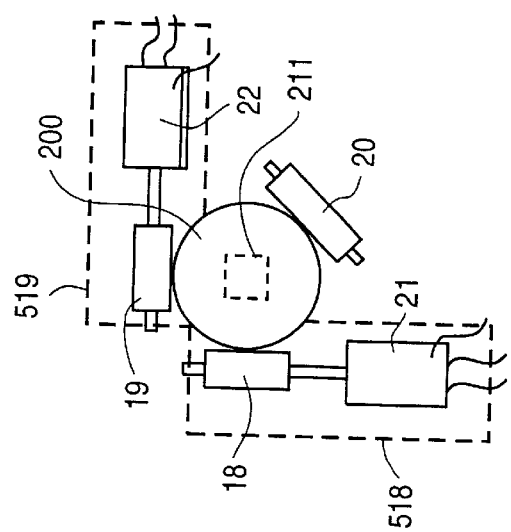
FIG. 4C
FIG. 4B
FIG. 4A

SCROLL SELECT-ACTIVATE BUTTON FOR WIRELESS TERMINALS

CROSS-REFERENCE TO RELATED APPLICATIONS

This application is related to application Ser. No. 08/944,030, and U.S. Pat. No. 6,201,531 filed Oct. 3, 1997, entitled "Trackball for Single Digit Control of Wireless Terminals."

BACKGROUND OF THE INVENTION

1. Field of the Invention

The present invention relates to cursor control devices and, particularly, to control devices for single digit control of a wireless terminal.

2. Description of the Related Art

Wireless terminals including cellular telephones and other wireless telecommunication devices are providing increasingly sophisticated functionality. Functions performed by hand-held wireless terminals require an increasing degree of user input and interaction. For example, a typical wireless terminal includes a viewscreen, typically a liquid crystal display (LCD), a keypad, and a plurality of control buttons or switches to allow the user to scroll through menu options or manipulate a cursor on the viewscreen. One such control is a dial, such as on the Sony CM RX100 telephone, which may be used to "roll" through menu options. Alternatively, forward and reverse buttons such as on the Motorola Star TAC telephone, may be employed to accomplish this task. The Siemens S4, the Qualcomm QCP 800 and QCP 1900 each provide a volume button on the side of the terminal which may also be used to scroll through menus on the viewscreen. Finally, certain wireless terminals provide a trackball on the front face of the wireless terminal to position a cursor on the viewscreen. Each of these controls is also associated with a separate select button to allow selection of the menu item highlighted by the cursor.

Such menu selection or cursor pointing devices require cumbersome hand or finger movements. More particularly, such user interfaces have typically required the manipulation of a trackball, keys, or dial in order to locate a cursor or scroll through menus on the viewscreen. A separate motion on a separate select key is required to select the item highlighted by the cursor. Frequently this is error-prone and counter-intuitive. Accordingly, there is a need for an improved user interface for a wireless terminal which is capable of being manipulated by a single finger in both cursor positioning and select modes.

In addition, wireless terminals are subjected to relatively severe operating conditions. Control buttons such as an on-switch may be jostled and thus unintentionally activated thereby draining batteries. Cursor controls may be exposed to liquids, which can have a deleterious effect on their functionality. This is particularly the case when the control is a trackball, due to the electromechanical or optomechanical structure required to convert the ball's rotation into cursor movement. Accordingly, there is a need for an improved cursor control which is relatively immune from unintentional activation and/or liquid spillage.

SUMMARY OF THE INVENTION

These drawbacks in the prior art are overcome in large part by a side-mounted cursor controller including a sliding cover according to the present invention. A wireless terminal is provided including a key pad and a side mounted cursor pointing device, such as a trackball. A sliding cover is provided which can slide over the cursor pointing device in an "off" position. When the cover is slid off the cursor pointing device, a biasing member upon which the cursor pointing device rests allows the trackball to pop out and into position. The user can press down on the cursor pointing device in order to make a selection. In addition, the sliding cover may be an on-off switch for the wireless terminal.

According to one embodiment of the present invention, an electronic controller with an improved user interface is provided. The user interface includes a cursor pointing device and a controller housing adapted to receive the cursor pointing device. A select control such as a switch, is coupled to the cursor pointing device and the controller housing, and is configured to be activated when the cursor pointing device is depressed. A sliding member is coupled to the controller housing. The sliding member is configured to conceal the cursor pointing device when the sliding member is in a first position, and expose the cursor pointing device when the sliding member is in a second position. The sliding member also may function as an on-off switch for the electronic controller or the device being controlled. The cursor pointing device may be provided with a biasing member such that the biasing member positions the cursor pointing device in an inactive position when the sliding member is in the first position and is configured to position the cursor pointing device in an active position when the sliding member is in the second position.

A method for operating an electronic controller according to the present invention includes sliding a sliding member from a first position to a second position on a controller housing. The sliding member conceals a cursor pointing device when the sliding member is in the first position, and exposes the cursor pointing device when the sliding member is in the second position. The method further includes translating the cursor pointing device from an inactive position when the sliding member is in the first position to an active position when the sliding member is in the second position. Finally, the method further includes using the cursor pointing device to position a cursor on a viewscreen, for example, scrolling through menu options and depressing the cursor pointing device to select an item on the viewscreen positioned proximately to the cursor.

BRIEF DESCRIPTION OF THE DRAWINGS

A better understanding of the present invention is obtained when the following detailed description is considered in conjunction with the following drawings in which:

FIGS. 4A–4C illustrate motion sensors used in a trackball-type cursor pointing device according to an embodiment of the present invention.

DETAILED DESCRIPTION OF THE INVENTION

Figure 1A:
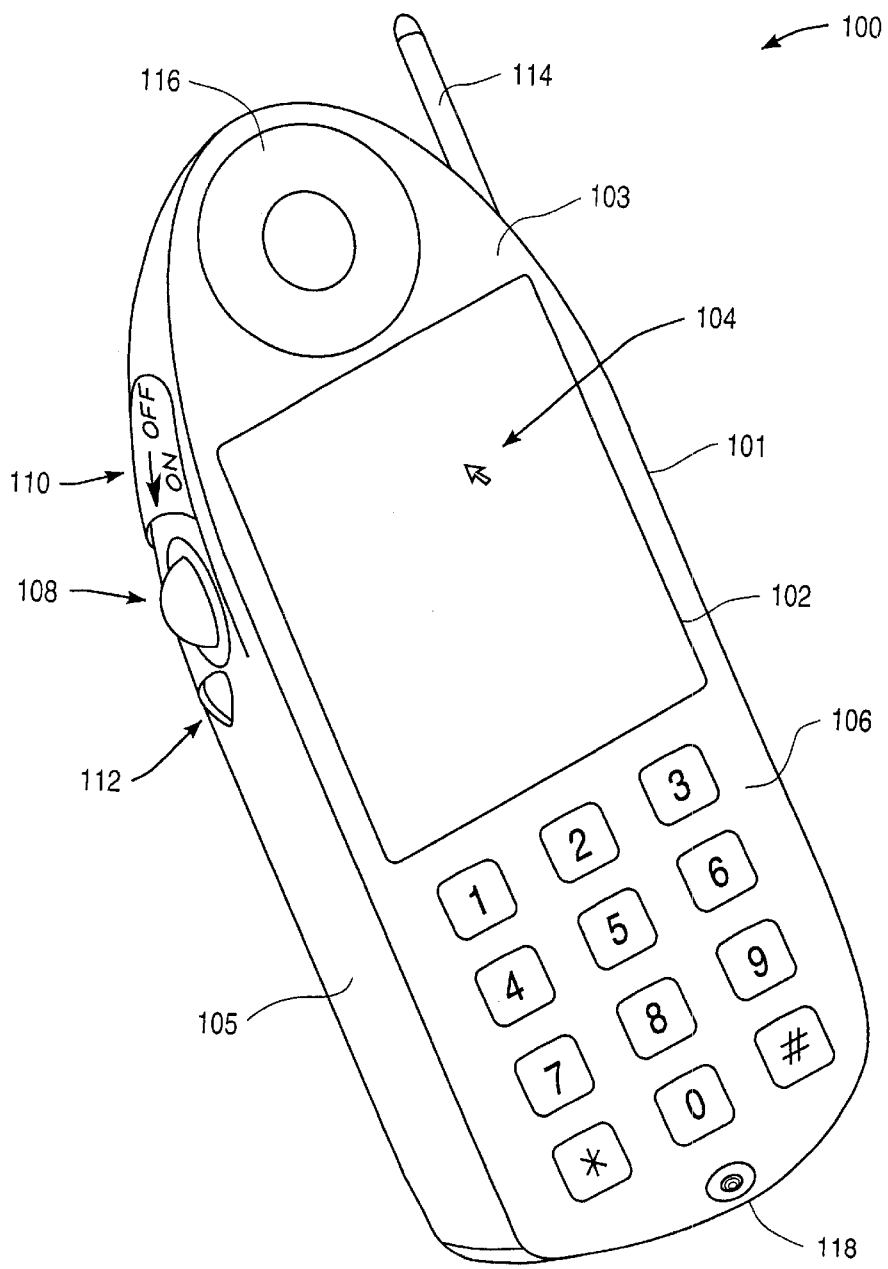
FIGS. 1A, 1B and 1C are diagrams of a wireless terminal according to embodiments of the present invention.

Turning now to FIG. 1A, a diagram illustrating a wireless terminal 100, such as a cellular or PCS telephone, employing a side-mounted cursor pointing device 108 (in this case a trackball) having a sliding cover 110, is illustrated. The wireless terminal 100 includes a terminal housing 101 having a front or first face 103 and a second or side face 105. It is noted that while wireless terminal 100 is illustrated as having discrete faces 103 and 105, in alternate embodiments, terminal housing 101 may be generally cylindrical or ellipsoidal in shape, and thus not have discrete front and side faces. Accordingly, as used herein, the term "first side" and "second side" include first and second side portions or regions, respectively. The terminal housing 101 includes a keypad or keyboard 106 situated, for example, on the front face 103. In the embodiment illustrated, a viewscreen 102 is also situated on the front face 103. The viewscreen 103 may be a liquid crystal display (LCD) screen. In operation, the viewscreen 102 may include a cursor 104 (or other menu "highlight" indicia) which is controlled through manipulation of the cursor pointing device 108, as will be described in greater detail below.

As illustrated, the wireless terminal 100 further includes an antenna 114 projecting from the housing 101, a speaker 116, and a microphone 118. It is noted that, while illustrated as a wireless terminal, a variety of grippable electronic devices are contemplated, such as personal digital assistants (PDA's), calculators, electronic remote controllers, computers and the like. Thus, FIG. 1A is exemplary only.

The wireless terminal 100 further includes a sliding cover or sliding member 110 to at least partially conceal the cursor pointing device 108. In addition to protecting the cursor pointing device 108, the sliding cover 110 may be an on/off switch for the wireless terminal 100. A fixed or cooperating member 112 may be provided, such that when the sliding cover 110 covers or conceals the cursor pointing device 108, a more or less effective seal is effectuated. In the "off" position, the sliding cover 110 exposes the cursor pointing device 108 to view and/or operation.

As illustrated, the cursor pointing device 108 may be a trackball. However, it is noted that other types of cursor pointing devices, such as stick-type pointing devices including stick-pressure pointing devices, may be employed. As will be discussed in greater detail below, the cursor pointing device 108 is configured to control movement of the cursor 104 on the viewscreen 102. The cursor 104 is used to highlight and/or scroll through selections on the viewscreen 102. The selections are then selected by depressing the cursor pointing device 108, as will be described in greater detail below. Such selections can include, for example, menu selections, numbers, or even letters for entering text. Thus, in one embodiment, no separate keypad is required and the viewscreen can, for instance, be made larger.

Figure 1B:
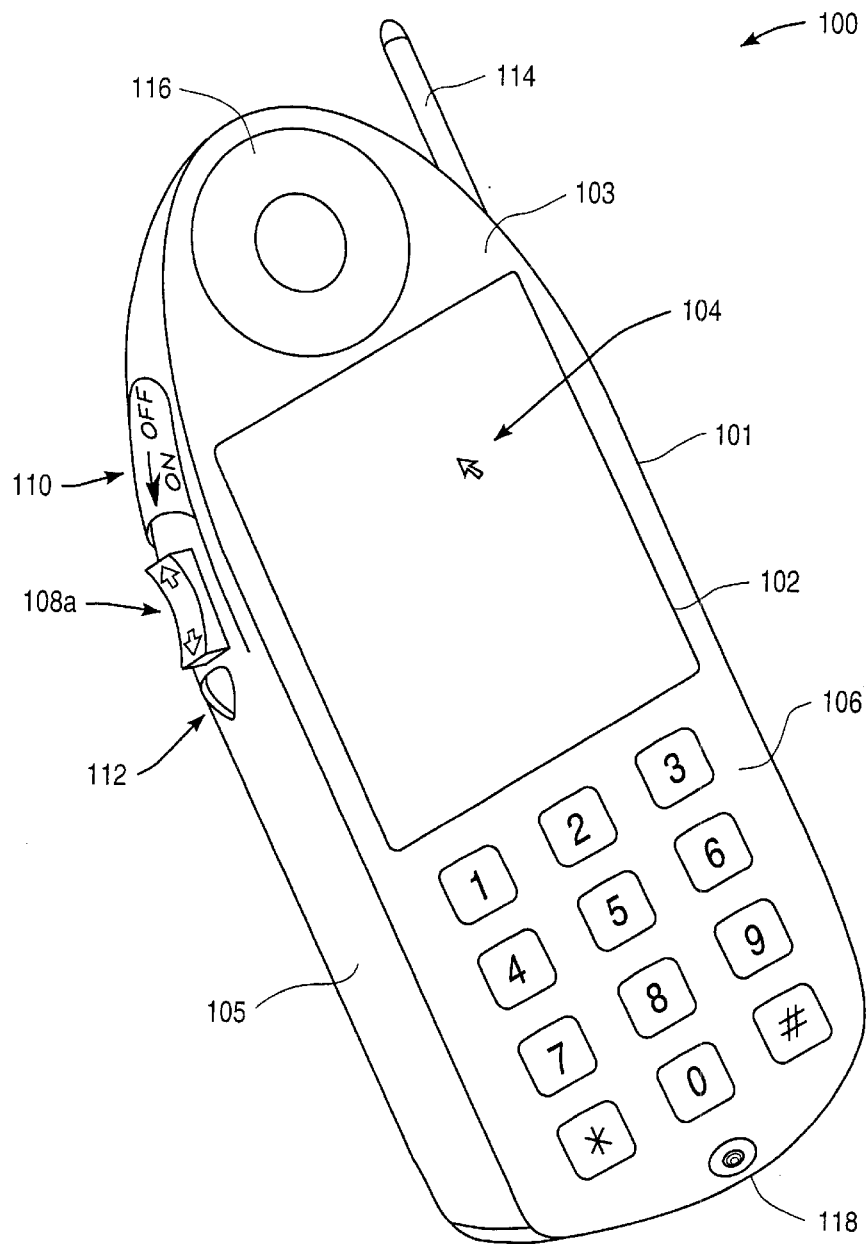

An exemplary alternate embodiment of the wireless terminal 100 is shown in FIG. 1B. For sake of clarity, common components retain the same reference numerals. In the embodiment illustrated, the cursor pointing device 108a is a three-position rocker arm button configured to permit a user to scroll up and down through a menu on the viewscreen 102. The rocker arm button 108a may be pressed for an activation function. In one embodiment, the rocker arm button 108a as a rubbery surface and is approximately the width of a thumb. The rocker arm button 108a may be configured to permit the sliding member 110 to slide over it.

Figure 1C:
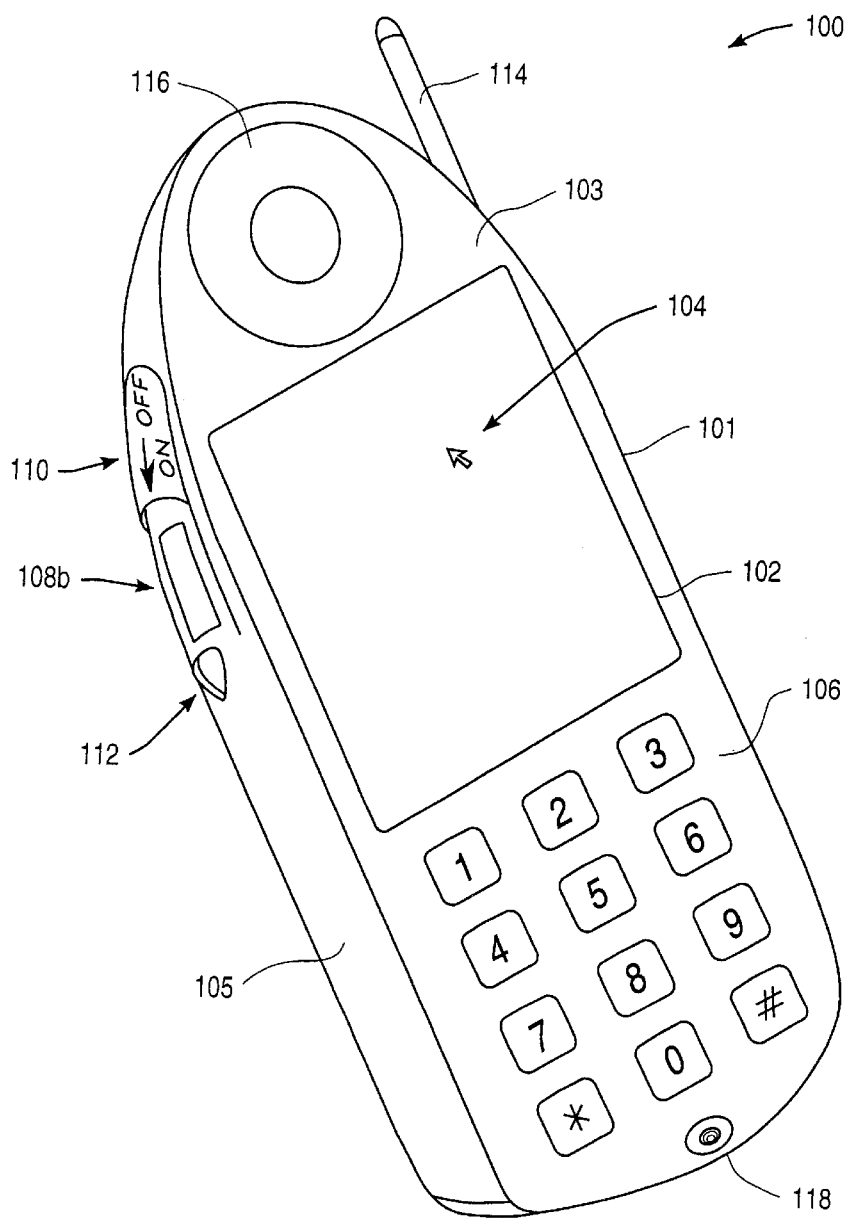

A yet further embodiment of the wireless terminal 100 is shown in FIG. 1C. In the embodiment illustrated, the cursor pointing device 108b is a track-pad or touch-type cursor pointing device. Such a touch pad may include pressure, optical or resisto-capacitive sensors. Scrolling through a menu or manipulating a cursor on the viewscreen 102 is accomplished by running a thumb along the surface of the track-pad 108b. The activation or control select function is accomplished by pressing on or tapping the track pad 108b.

Figure 2:
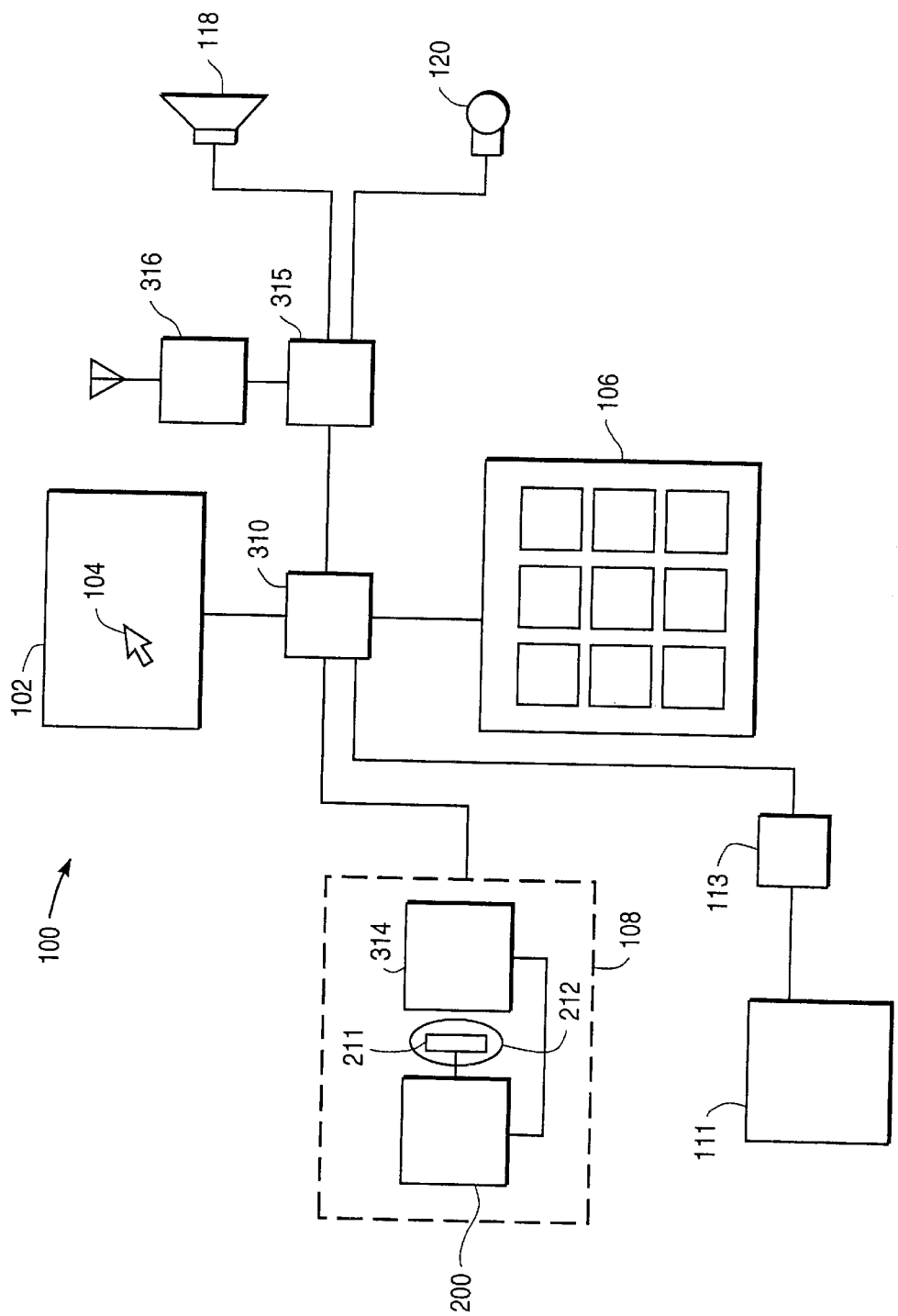
FIG. 2 is a block diagram illustrating a wireless terminal including a cursor pointing device according to an embodiment of the present invention.

Turning now to FIG. 2, a block diagram of the wireless terminal 100 employing a cursor pointing device 108 according to the present invention is illustrated. The wireless terminal 100 includes a cursor pointing device 108 which, as discussed above, may be a stick, trackball or rocker arm button type cursor pointing device. In addition, the cursor pointing device 108 may also be a track pad. The cursor pointing device 108 thus includes a pointer 200 (which is either a stick, a ball or a button) coupled to a movement translator 314. The movement translator 314 is configured to identify and convert motion of the pointer 200 (or, in the case of the track pad, motion on the surface of the pointer) into movement of the cursor 104 on the viewscreen 102. The movement translator 314 is coupled to an input controller 310. A switch 211 intercouples the pointer 200 with the input controller 310. When the pointer 200 is depressed, the switch 211 is closed and a corresponding signal is sent to the input controller 310, thereby selecting the item on the viewscreen 102 highlighted by the cursor. In the case of the track pad, no separate activation switch is required. Instead, the movement translator 314 and input controller 310 are configured to recognize a pressing or tapping on the track pad's surface as an activation, for example, via optical or diode or capacitance detectors. The input controller 310 is coupled to the viewscreen 102 and to a keyboard or keypad 106. As will be discussed in greater detail below, a biasing member 212 may also be included. The biasing member 212 provides adequate tactile response for the cursor pointing device and/or enables the pointer to translate or "pop" into a more user-friendly position, when the wireless terminal is active, relatively higher with respect to the surface of the terminal than when the wireless terminal is inactive.

The wireless terminal 100 further includes an on-off switch 111 which is activated when the sliding member 110 (FIG. 1) is slid off the cursor pointing device. The on-off switch 111 is thus coupled to a power supply unit 113, which in turn is coupled to provide power to the other functional units of the wireless terminal 100. It is noted that in an alternate embodiment, the on-off switch 111 is coupled to activate an on-off switch on a unit remote from the wireless terminal 100. In addition, the wireless terminal 100 includes a transceiver and modulator unit 316 coupled to a control processor 315, which in turn is coupled to the input controller 310. A microphone 120 and a speaker 118 are also coupled to the control processor 315. The control processor 315 includes a central processing unit and a variety of other control circuitry (not illustrated). In the case of a cellular telephone, for example, such control circuitry is provided to control the switching of a telephone call between cells. The cursor pointing device 108 is thus operable to, for example, dial a telephone via a video menu.

Figure 3A:
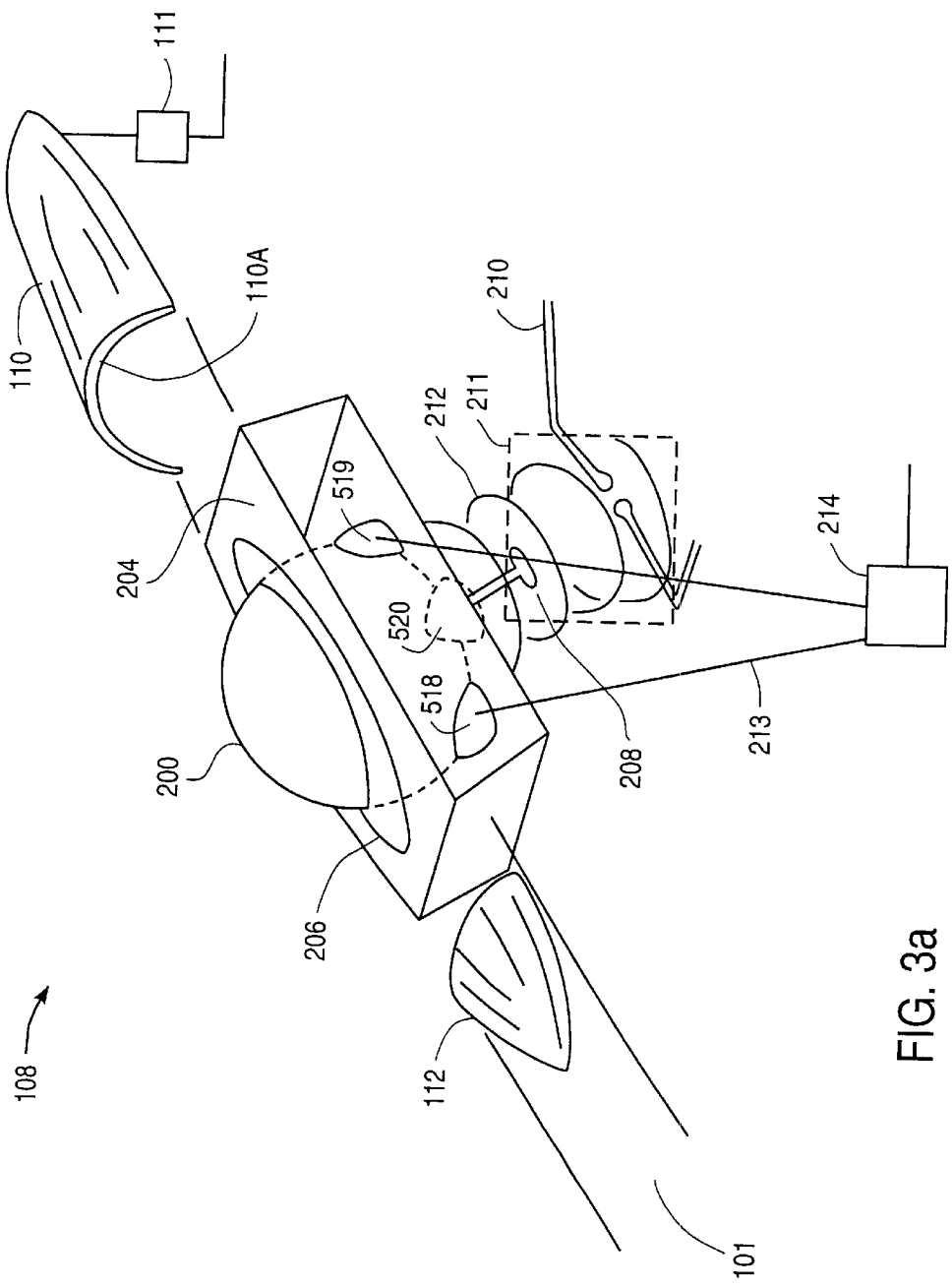
FIGS. 3A, 3B and 3C are diagrams illustrating cursor pointing devices and sliding covers according to embodiments of the present invention.

Turning now to FIG. 3A, a more detailed diagram of a trackball-type cursor pointing device 108 for an electronic controller or wireless terminal is illustrated. The cursor pointing device 108 includes a ball 200 and a locking collar 206 to hold the ball 200 in place. A sliding member 110 and a fixed member 112 are coupled to the controller housing 101. As illustrated, the ball 200 is situated within a first housing 204. The trackball housing 204 includes motion sensors 518, 519 to identify movement of the ball 200. The motion sensors 518, 519 are coupled to a detection unit 214 within the controller housing 101, which translates the detected motion of the ball 200 into digital signals for controlling the cursor on the viewscreen. As illustrated, flexible leads 213 are provided to the detection unit 214 situated within the housing 101. It is noted that, in alternate embodiments, the detection unit 214 may be located within the trackball housing 204.

The housing 204 operably couples the ball 200 to a biasing member 212. The biasing member 212 includes a spring or other biasing mechanism to maintain the housing 204 and the ball 200 in a state of tension. The biasing member 212 maintains the switch 211 in an open position. The switch 211 includes housing leads 208 and terminal leads 210. When the cursor pointing device is depressed, the switch 211 is closed and the leads 208 come into contact with the leads 210, thereby closing the connection.

In one embodiment, the biasing member 212 performs the additional function of causing the ball 200 and/or housing 204 to translate or "pop up" when the sliding member 110 is slid off of the ball 200. Thus, in operation, the sliding member 110 and the ball 200 are in sliding or rolling contact with one another. The sliding member 110 is further configured to be able to slide back on to the ball 200, thereby concealing or protecting it. Thus, when in an active mode, the cursor pointing device may be disposed relatively higher than when inactive. The sliding member 110 is coupled to a switch 111. Activation of the on-off switch 111 causes power to be supplied to the wireless controller or a remote unit.

Figure 3B:
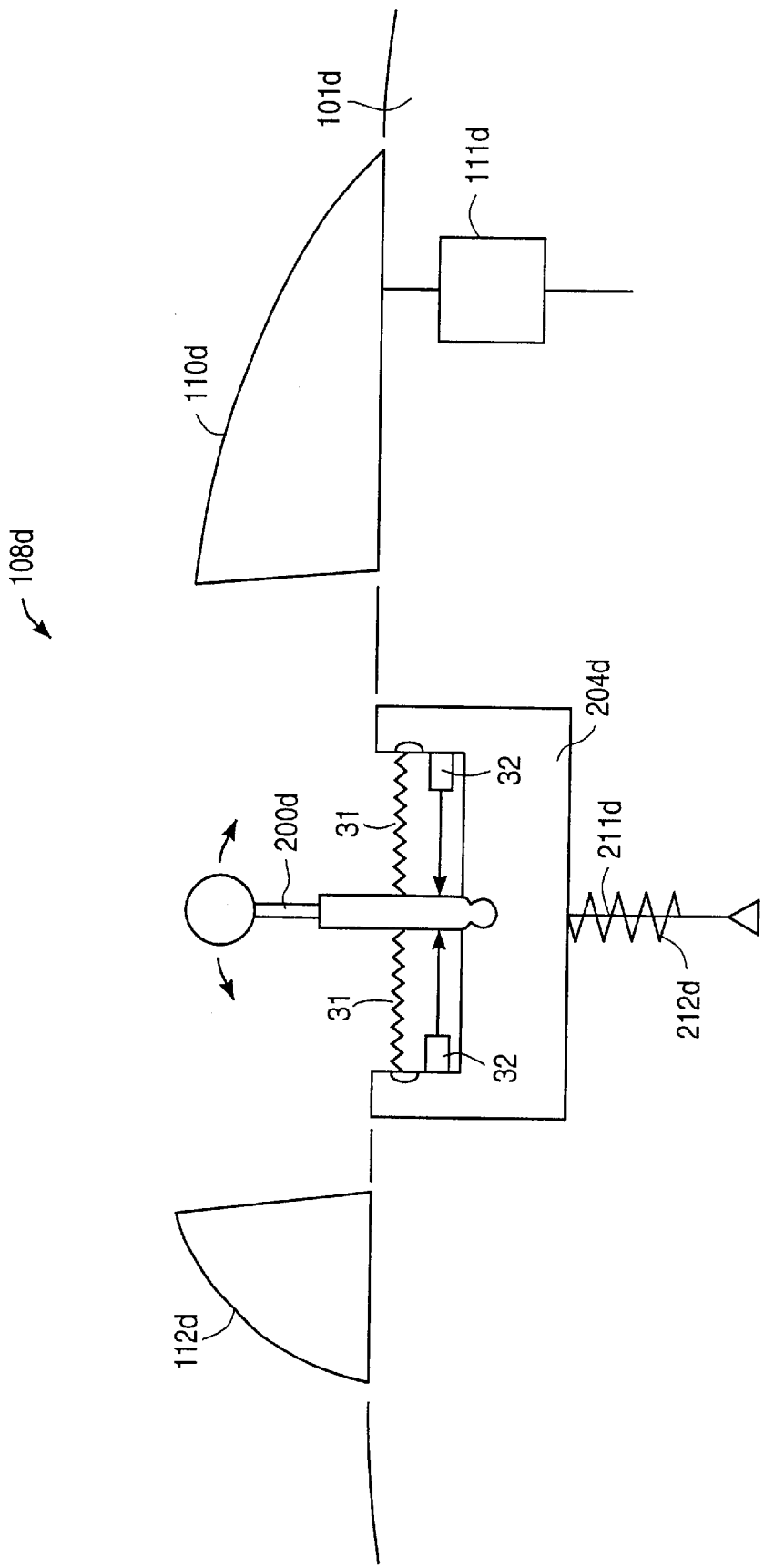

Turning now to FIG. 3B, a diagram of a stick-type cursor positioning or pointing device 108d is shown. A stick 200d is coupled to a housing 204d and disposed within controller housing 101d. Springs 31 keep the stick 200d normally in a vertical position. However, the operator can press the stick 200d away from the vertical position. Sensors 32 are mounted at the bottom of the stick 200d and can detect in which direction the operator is pressing the stick and how hard he is pressing the stick. This information is then used to control the cursor.

In a manner similar to that described with regard to FIG. 3A, the housing 204d is coupled by way of a spring or biasing member 212d to the terminal housing (not shown). A switch 211d is provided which, when the stick 200d is depressed, engages with a corresponding circuit trace in the terminal housing.

A sliding cover 110d and a fixed member 112d are provided on the wireless terminal housing. The sliding cover operates to conceal or protect the cursor pointing device when cooperatively engaged with the fixed member 112d. Additionally, the sliding member 110d is coupled to a switch 111d. The switch 111d may be an on-off switch, which is activated when the sliding cover 110d is positioned to expose the cursor pointing device to view.

The sliding cover 110d and the cursor pointing device may be engageable in sliding contact such that when the sliding member 110d is positioned to expose the cursor pointing device to view, the cursor pointing device translates or "pops up" from an inactive to an active position.

Figure 3C:
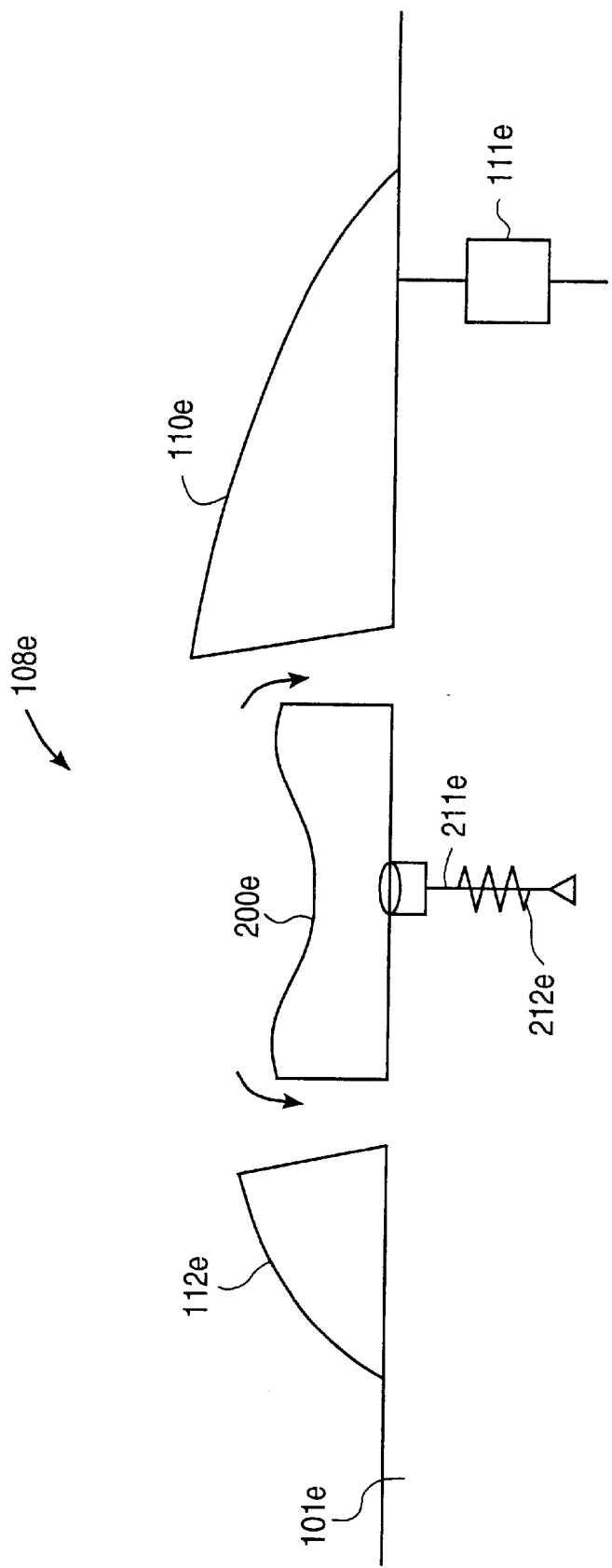

FIG. 3C illustrates a rocker arm button-type cursor pointing device according to an embodiment of the present invention. Pressing one end of the rocker arm causes cursor movement in one direction. Pressing the other causes cursor movement in the other direction.

The three-way rocker arm 200e is disposed on a housing 101e. A switch 211e is provided as an activation or select control, similar to that discussed above. As illustrated, a spring or biasing member 212e may be provided to spring the rocker arm 200e into position when the sliding member 110e is slid away. It is noted that, in one embodiment, the sliding member 110e is in contact with the rocker arm 200e. In an alternate embodiment, there is clearance between the rocker arm 200e and the sliding member 110e. The sliding member 110e is further coupled to a switch 111e such that the switch 111e is activated when the rocker arm 200e is exposed.

A more detailed diagram of the optomechanical encoders or motion sensors 518, 519 of FIG. 3A is shown in FIG. 4. Turning now to FIG. 4A, the ball 200 is operably coupled to a switch 211 such that, when the ball 200 is depressed, a control signal is sent to a controller (not shown).

In addition, the ball 200 touches three rollers 18, 19 and 20. One roller 20 is free rolling; the other two rollers 18 and 19 form part of an optomechanical encoder. The rollers 18 and 19 are connected to systems for detecting the direction of the revolution of the roller, the length of rolling and also the speed of the rolling. One of the detection rollers 18 is referred to as the x axis controller and another roller 19 90° off the x axis roller), is referred to as the y axis controller. These two rollers, 18 and 19, work independently. Each detection roller is coupled to a movement sensor 21 or 22, which is an electromechanical device used to sense the direction and speed of the roller movement.

FIGS. 4B and 4C show one method for implementing such a detection system. A disk 24 with a series of small holes 25 is mounted on the roller axle 26. A photodetection system 27 formed of a light transmitter 27A and a light receiver 27B senses each hole 25 as the disk 24 spins. With a proper design of the hole pattern, a detection unit 28 can detect the speed of the roller rotation, the direction and the length. The information about the direction and movement from both the x and y controllers are transferred to the cursor on the viewscreen. The ratio between the movement of the ball and the x and y direction and the corresponding movement of the cursor in the same directions may be set to suit the specific taste and requirements of the operator.

It is noted that while an electromechanical or optomechanical sensor system has been illustrated, an electromechanical system mounted upon the roller axles may be employed, as may any of a variety of purely optical systems.

Figure 5A:
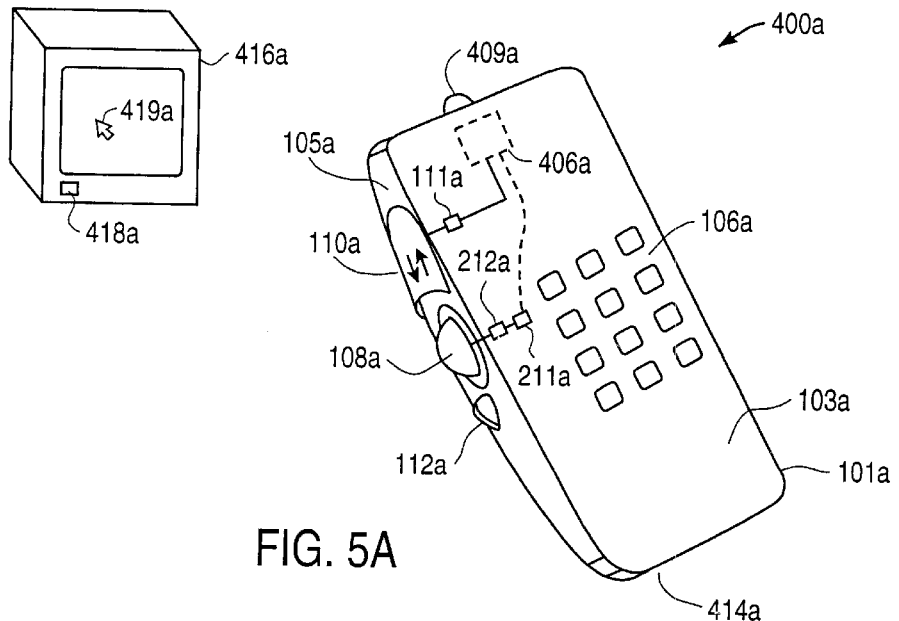
FIGS. 5A, 5B and 5C are diagrams illustrating other embodiments of the present invention.

Turning now to FIG. 5A, a diagram of an alternate embodiment of the present invention is illustrated. The remote control system 400a includes a wireless terminal or remote or electronic controller 414a.

Remote controller 414a includes a housing 101a and a keypad or keyboard 106a on a face of the controller housing. A cursor pointing device 108a, such as those illustrated in FIGS. 1–4 is provided. The cursor pointing device 108a controls a cursor 419a on a video monitor or remote unit 416a. Motion sensors and a detection unit (not shown) are provided to convert movement of the cursor pointing device 108a into cursor movements or menu highlights on the remote unit 416a. The remote controller 414a and video monitor 416a may communicate via a control signal generator 406a, such as an infrared signal generator and a lens 409a in remote controller 414a. The infrared signal is provided to an infrared sensor 418a in the video monitor 416a. The received signals are provided to control circuitry (not shown) which translates the received signals into movements of the cursor 419a on the video screen. It is noted that, while described with respect to infrared signals, a variety or other wireless or wire-connected media are contemplated.

The cursor pointing device 108a according to the present invention includes an integrated select switch 211a, similar to that described above, such that when cursor pointing device 108a is depressed, a select function is activated. For example, an area proximate to the cursor on the viewscreen is selected when the switch 211a is activated. The area may be representative of letters, or numbers, for example.

In addition, a sliding member 110a is provided on the housing 101a. The sliding member 110a operates in conjunction with a fixed member 112a to protect the cursor pointing device when the sliding member is in a first position, and to expose the cursor pointing device 108a when the sliding member is in a second position. In one embodiment, the cursor pointing device and the sliding member 110a are in sliding contact with one another.

A biasing member 212a is configured to position the cursor pointing device in an active position, relatively higher than the cursor pointing device's position when inactive, when the sliding member 110a is in the first position. The sliding member 112a also may engage an on-off switch or switch controller 111a. When engaged to expose the cursor pointing 108a device to view, the sliding member 110a a activates the on-off switch 111a to turn on, or cause power to be provided to, the remote unit 416a.

Figure 5B:
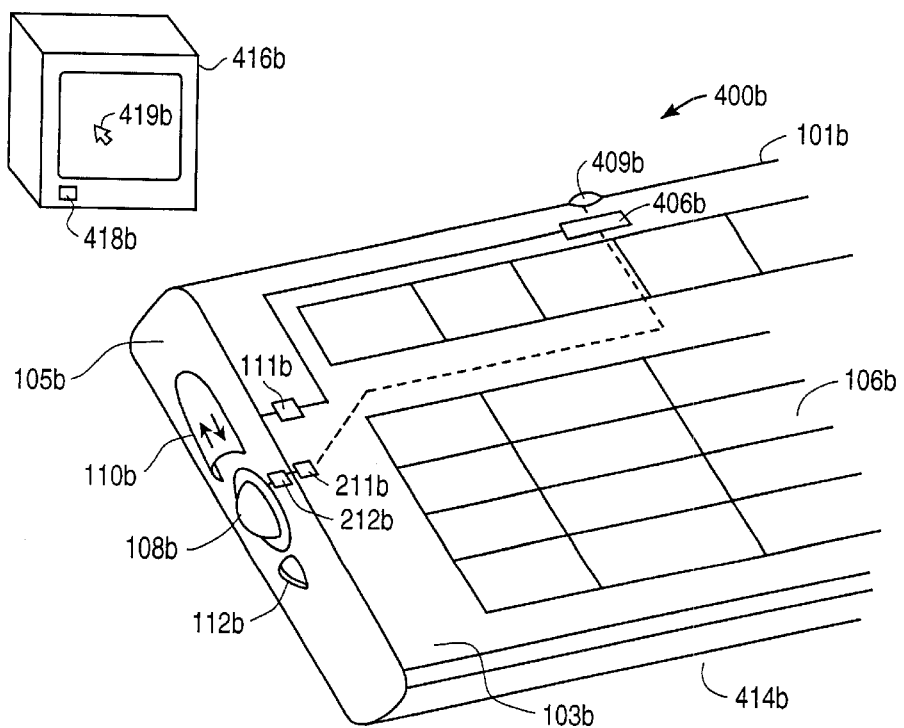

Turning now to FIG. 5b, another embodiment of the present invention is illustrated. The remote control system 400b includes a computer keyboard or electronic controller 414b. The computer keyboard 414b includes a housing 101b and a keypad or keyboard 106b on a face of the controller housing. A cursor pointing device 108b, such as that illustrated in FIGS. 1 and 3, is provided. The cursor pointing device 108b controls a cursor 419b on a video monitor or remote unit 416b. Motion sensors and a detection unit (not shown) are provided to convert movement of the cursor pointing device 108b into cursor movements on the remote unit 416b.

The computer keyboard 414b and video monitor 416b may communicate via a control signal generator 406b, such as an infrared signal generator and a lens 409b in the computer keyboard 414b. The infrared signal is provided to a infrared sensor 418b in video monitor 416b. The received signals are provided to control circuitry (not shown) which translates the received signals into movements of the cursor 419b on the video screen. It is noted that, while described with respect to infrared signals, a variety of other wireless or wire-connected media are contemplated, such as serial or parallel bus interfaces. In addition, the keyboard 414b may be part of a laptop computer.

A cursor pointing device 108b according to the present invention includes an integrated select switch 211b, similar to that described above, such that when cursor pointing device 108b is depressed, a select function is activated. In addition, a sliding member 110a b is provided on the housing 101b. The sliding member 110b operates in conjunction with a fixed member 112b to protect the cursor pointing device when the sliding member is in a first position, and to expose cursor pointing device 108b when the sliding member is in a second position.

A biasing member 212b is configured to position the cursor pointing device 108b in an active position when the sliding member 110b is in the first position. The sliding member 112b also may engage an on-off switch or switch controller 111b. When engaged to expose the cursor pointing device 108b to view, the sliding member 110b activates the on-off switch 111b to turn on, or cause power to be provided to, the remote unit 416b.

It is noted that, while illustrated on a side of the keyboard housing 101b, the cursor pointing device 108b and sliding member 110b may be positioned on the same face of the housing 101b as the keyboard itself. For example, the cursor pointing device 108b may be positioned below a space key on the keyboard.

Figure 5C:
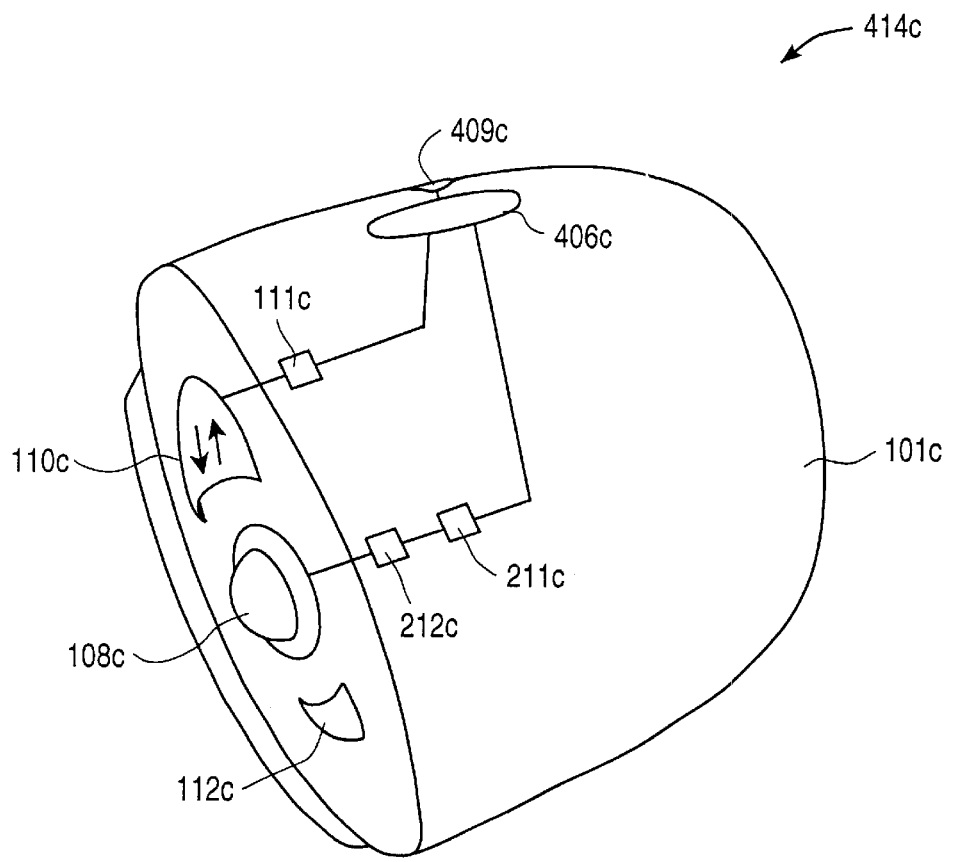

Turning now to FIG. 5c, another embodiment of the present invention is illustrated. An electronic controller 414c includes a stand-alone cursor pointing device, such as a trackball or joystick-type controller for a desktop computer. The electronic controller 414c includes a housing 101c. A cursor pointing device 108c, such as that illustrated in FIGS. 1 and 3 is provided. The cursor pointing device 108c controls a cursor on a video monitor (not shown). Motion sensors and a detection unit (not shown) are provided to convert movement of the cursor pointing device 108c into cursor movements on the monitor screen. Again, the controller may communicate with a remote unit via a control signal generator 406c, which may be an infrared signal generator and a lens 409a. However, a variety of other wired or wireless interfaces are contemplated, such as serial or parallel bus interfaces.

A cursor pointing device 108c according to the present invention includes an integrated select switch 211c, similar to that described above, such that when cursor pointing device 108c is depressed, a select function is activated. In addition, a sliding member 110a c is provided on housing 101c. Sliding member 110c operates in conjunction with fixed member 112c to protect the cursor pointing device when the sliding member is in a first position, and to expose cursor pointing device 108c when the sliding member is in a second position.

A biasing member 212c is configured to position the cursor pointing device in an active position when the sliding member 110a c is in the first position. In one embodiment, sliding member 112c also engages an on-off switch or switch controller 111c. When engaged to expose the cursor pointing device to view, the sliding member 110c activates on-off switch 111c to turn on, or cause power to be provided to, the computer. Alternatively, activation of the on-off switch causes the computer to wake from a "sleep" mode.

It is noted that the select function may be performed by pressing or tapping a track pad surface. In such an embodiment, no separate select switch need be provided. Similarly, no biasing member need be provided.

The invention described in the above detailed description is not intended to be limited to the specific form set forth herein, but on the contrary, it is intended to cover such alternatives, modifications and equivalents as can reasonably be included within the spirit and scope of the appended claims.

What is claimed is:

1. An electronic controller having an improved user interface, comprising:
   a controller housing;
   a cursor pointing device carried by said controller housing on a side face, at least a portion of said cursor pointing device being operably accessible to a user and operable to receive user input to control operation of said electronic controller;
   a select control operably coupled to said cursor pointing device wherein said select control is configured to be activated when said cursor pointing device is depressed; and
   a sliding member coupled to said controller housing on said side face wherein said sliding member is configured to at least partially conceal said cursor pointing device when said sliding member is in a first position and is configured to expose said cursor pointing device when said sliding member is in a second position.

2. The electronic controller of claim 1, wherein said cursor pointing device is configured to be operated by a single finger.

3. The electronic controller of claim 1, wherein said cursor pointing device is positioned in a location of said controller housing such that, when said controller is in operation, a user's thumb or other finger of a hand holding said electronic controller is proximate to said cursor pointing device, thereby allowing said user's thumb or other finger to control said cursor pointing device.

4. The electronic controller of claim 1, further comprising a switch located in said controller housing and coupled to said sliding member, wherein said switch is configured to be activated when said sliding member is in said second position and is configured to be deactivated when said sliding member is in said first position.

5. The electronic controller of claim 4, wherein said switch is an on-off switch, wherein activation of said on-off switch provides power to said electronic controller.

6. The electronic controller of claim 4, wherein said switch is an on-off switch, wherein activation of said on-off switch causes power to be provided to a remote unit.

7. The electronic controller of claim 4, further comprising a biasing member located in said controller housing, wherein said cursor pointing device is in biasing contact with said biasing member such that said biasing member is configured to position said cursor pointing device in an inactive position when said sliding member is in said first position and said biasing member is configured to position said cursor pointing device in an active position, relatively higher than said inactive position, when said sliding member is in said second position.

8. The electronic controller of claim 1, wherein said cursor pointing device comprises a trackball.

9. the electronic controller of claim 1, wherein said cursor pointing device comprises a stick pointer.

10. The electronic controller of claim 1, wherein said cursor pointing device is a rocker arm switch.

11. The method of claim 10, wherein said activating a switch comprises activating a power source on a remote unit.

12. The electronic controller of claim 1, wherein said cursor pointing device is a track pad.

13. A method for operating an electronic controller, comprising:

sliding a sliding member from a first position to a second position on a side face of a controller housing, wherein said sliding member at least partially conceals a cursor pointing device when said sliding member is in said first position, and said sliding member exposes said cursor pointing device when said sliding member is in said second position;

translating said cursor pointing device from an inactive position when said sliding member is in said first position, to an active position disposed relative to said inactive position, when said sliding member is in said second position;

using said cursor pointing device to position a cursor on a viewscreen on a front face of said housing; and depressing said cursor pointing device to select an item on said viewscreen positioned proximately to said cursor.

14. The method of claim 13, further comprising sliding said sliding member from said second position to said first position to conceal said cursor pointing device.

15. The method of claim 14, further comprising translating said cursor pointing device from said active position to said inactive position when said sliding member is slid from said second position to said first position.

16. The method of claim 14, wherein said sliding member from said second position to said first position causes said sliding member to be in contact with said cursor pointing device.

17. The method of claim 13, wherein said sliding member from said first position to said second position comprises activating a switch which controls a power source.

18. The method of claim 17, wherein said activating a switch comprises activating a power source disposed within said controller housing.

19. The method of claim 13, wherein sliding said sliding member from said first position to said second position causes said sliding member to be in contact with said cursor pointing device.

20. The method of claim 13, wherein said depressing said cursor pointing device comprises depressing a control switch.

21. The method of claim 13, wherein said using said cursor pointing device comprises using a trackball.

22. The method of claim 13, wherein said using said cursor pointing device comprises using a stick-type pointer.

23. The method of claim 13, wherein said using said cursor pointing device comprises using a track pad.

24. The method of claim 13, wherein said using said cursor pointing device comprises using a rocker arm button.

* * * * *